United States Patent
Small et al.

(10) Patent No.: US 12,542,685 B2
(45) Date of Patent: Feb. 3, 2026

(54) SYSTEMS AND METHODS FOR SECURELY TRANSFERRING ACCOUNT INFORMATION BETWEEN DEVICES

(71) Applicant: Cisco Technology, Inc., San Jose, CA (US)

(72) Inventors: Robert Jacob Linial Small, Ann Arbor, MI (US); Jordan David Neidlinger, Saline, MI (US); Benjamin Warren Freiband, Ann Arbor, MI (US); Aparna Ashok, Duvall, WA (US); Marshall Dean Anderson, Chicago, IL (US)

(73) Assignee: Cisco Technology, Inc., San Jose, CA (US)

( * ) Notice: Subject to any disclaimer, the term of this patent is extended or adjusted under 35 U.S.C. 154(b) by 251 days.

(21) Appl. No.: 18/066,467

(22) Filed: Dec. 15, 2022

(65) Prior Publication Data

US 2024/0205026 A1    Jun. 20, 2024

(51) Int. Cl.
  *H04L 9/32* (2006.01)
(52) U.S. Cl.
  CPC .......... *H04L 9/3263* (2013.01); *H04L 9/3236* (2013.01); *H04L 2209/46* (2013.01)
(58) Field of Classification Search
  CPC . H04L 2209/46; H04L 9/32363; H04L 9/263; H04L 63/0492; H04L 63/0823; H04W 12/069; H04W 12/50; H04W 12/71; H04W 12/77; H04W 12/63; H04W 12/47; H04W 4/70; H04W 4/005; H04W 4/205;
  (Continued)

(56) References Cited

U.S. PATENT DOCUMENTS

| 6,772,331 | B1 * | 8/2004 | Hind | G06F 21/445 |
| | | | | 707/999.009 |
| 7,350,074 | B2 * | 3/2008 | Gupta | H04L 9/321 |
| | | | | 713/157 |

(Continued)

FOREIGN PATENT DOCUMENTS

| EP | 4319043 A1 * | 2/2024 | ......... H04L 63/0823 |
| WO | WO-2021036183 A1 * | 3/2021 | ......... H04L 63/0823 |
| WO | WO-2023059696 A1 * | 4/2023 | ............. G06N 20/00 |

OTHER PUBLICATIONS

Alapetite, Alexandre. "Dynamic 2D-barcodes for multi-device Web session migration including mobile phones." Personal and Ubiquitous Computing 14 (2010): 45-52. (Year: 2010).*

(Continued)

*Primary Examiner* — Michael Simitoski
(74) *Attorney, Agent, or Firm* — Baker Botts L.L.P.

(57) ABSTRACT

In one embodiment, a method includes scanning, by a first device, a code from a second device and determining, by the first device, information comprising a peer identifier and a first certificate hash using the code. The method also includes initiating, by the first device, a connection with the second device using the peer identifier and receiving, by the first device, a second certificate hash from the second device via the connection. The method further includes validating, by the first device, the second certificate hash using the first certificate hash, establishing a session with the second device, and transferring, by the first device, account information to the second device via the session.

20 Claims, 5 Drawing Sheets

(58) Field of Classification Search
CPC ....... H04W 4/20; H04W 28/18; H04W 92/18; H04W 56/001
See application file for complete search history.

(56) References Cited

U.S. PATENT DOCUMENTS

| | | | |
|---|---|---|---|
| 9,143,504 B1* | 9/2015 | Shi | G06F 21/32 |
| 9,401,905 B1 | 7/2016 | Kowalski et al. | |
| 10,868,802 B2* | 12/2020 | Westerlund | H04L 63/0823 |
| 2007/0136800 A1* | 6/2007 | Chan | H04L 9/3236 713/181 |
| 2012/0287290 A1 | 11/2012 | Jain | |
| 2012/0308003 A1* | 12/2012 | Mukherjee | H04L 9/3247 380/243 |
| 2012/0331073 A1* | 12/2012 | Williams | H04L 67/1046 709/206 |
| 2013/0145165 A1* | 6/2013 | Brown | H04M 1/72412 713/176 |
| 2013/0237270 A1* | 9/2013 | Suumaki | H04W 76/11 455/517 |
| 2013/0340044 A1* | 12/2013 | Litvin | G06F 21/36 709/217 |
| 2015/0040222 A1* | 2/2015 | Boivie | H04L 41/0813 726/23 |
| 2016/0142211 A1 | 5/2016 | Metke et al. | |
| 2016/0142214 A1 | 5/2016 | Ekberg et al. | |
| 2016/0360412 A1* | 12/2016 | Wilson | H04L 67/06 |
| 2017/0280488 A1* | 9/2017 | Kawasaki | H04L 61/5007 |
| 2018/0191501 A1 | 7/2018 | Lindemann | |
| 2021/0044577 A1* | 2/2021 | Jung | H04L 9/3239 |
| 2021/0067347 A1* | 3/2021 | Yu | H04L 9/3247 |
| 2022/0155981 A1* | 5/2022 | Ciudad | G06F 8/65 |
| 2022/0166761 A1 | 5/2022 | Waterton et al. | |
| 2022/0255726 A1* | 8/2022 | Durak | H04L 9/0631 |
| 2022/0376933 A1* | 11/2022 | Guabtni | H04L 67/02 |
| 2023/0023647 A1* | 1/2023 | Voss | H04L 9/0838 |
| 2023/0300614 A1* | 9/2023 | Holkal | H04W 12/50 726/7 |
| 2024/0276228 A1* | 8/2024 | Zhou | H04L 9/0869 |

OTHER PUBLICATIONS

Álvarez, Flor, Max Kolhagen, and Matthias Hollick. "Sea of lights: Practical device-to-device security bootstrapping in the dark." 2018 IEEE 43rd Conference on Local Computer Networks (LCN). IEEE, 2018. (Year: 2018).*

J. M. McCune, A. Perrig and M. K. Reiter, "Seeing-is-believing: using camera phones for human-verifiable authentication, " 2005 IEEE Symposium on Security and Privacy (S&P'05), Oakland, CA, USA, 2005, pp. 110-124, doi: 10.1109/SP.2005.19. (Year: 2005).*

N. Saxena, J. . -E. Ekberg, K. Kostiainen and N. Asokan, "Secure device pairing based on a visual channel, " 2006 IEEE Symposium on Security and Privacy (S&P'06), Berkeley/Oakland, CA, USA, 2006, pp. 6 pp.-313, doi: 10.1109/SP.2006.35. (Year: 2006).*

Scott, David, et al. "Using visual tags to bypass Bluetooth device discovery." ACM Sigmobile Mobile Computing and Communications Review 9.1 (2005): 41-53. (Year: 2005).*

T. Panton, D. Llewellyn-Jones, N. Shone and M. H. Eiza, "Secure proximity-based identity pairing using an untrusted signalling service," 2016 13th IEEE Annual Consumer Communications & Networking Conference (CCNC), Las Vegas, NV, USA, 2016, pp. 942-947. (Year: 2016).*

International Search Report and Written Opinion for International Application No. PCT/US2023/082229, mailed Mar. 18, 2024, 12 Pages.

* cited by examiner

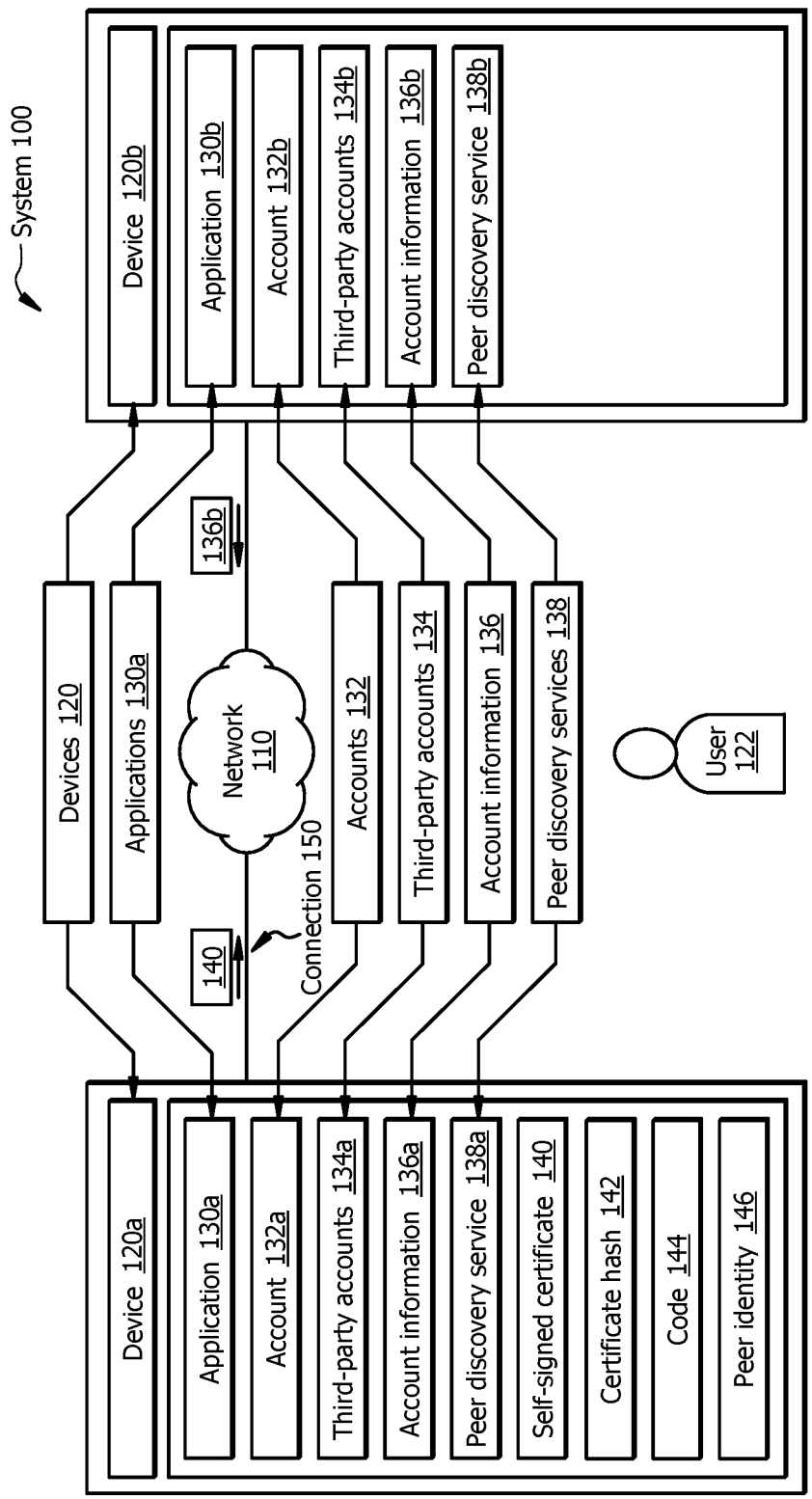

SYSTEMS AND METHODS FOR SECURELY TRANSFERRING ACCOUNT INFORMATION BETWEEN DEVICES

TECHNICAL FIELD

The present disclosure relates generally to communication networks, and more specifically to systems and methods for securely transferring account information between devices.

BACKGROUND

Certain online services and web applications such as Instagram, Facebook, and Snapchat, allow users to protect their accounts with a mobile-generated passcode. An application installed on a device may be used to generate these passcodes and keep one or more of the user's accounts in one application. However, because this account information is securely stored on the user's device, the user will encounter difficulties when attempting to transfer the account information to other devices. For example, if the user purchases a new device, the user may be unable to transfer the account information to their new device.

BRIEF DESCRIPTION OF THE DRAWINGS

FIG. 1 illustrates an example system for securely transferring account information between devices, in accordance with certain embodiments;

DESCRIPTION OF EXAMPLE EMBODIMENTS

Overview

Figure 3:
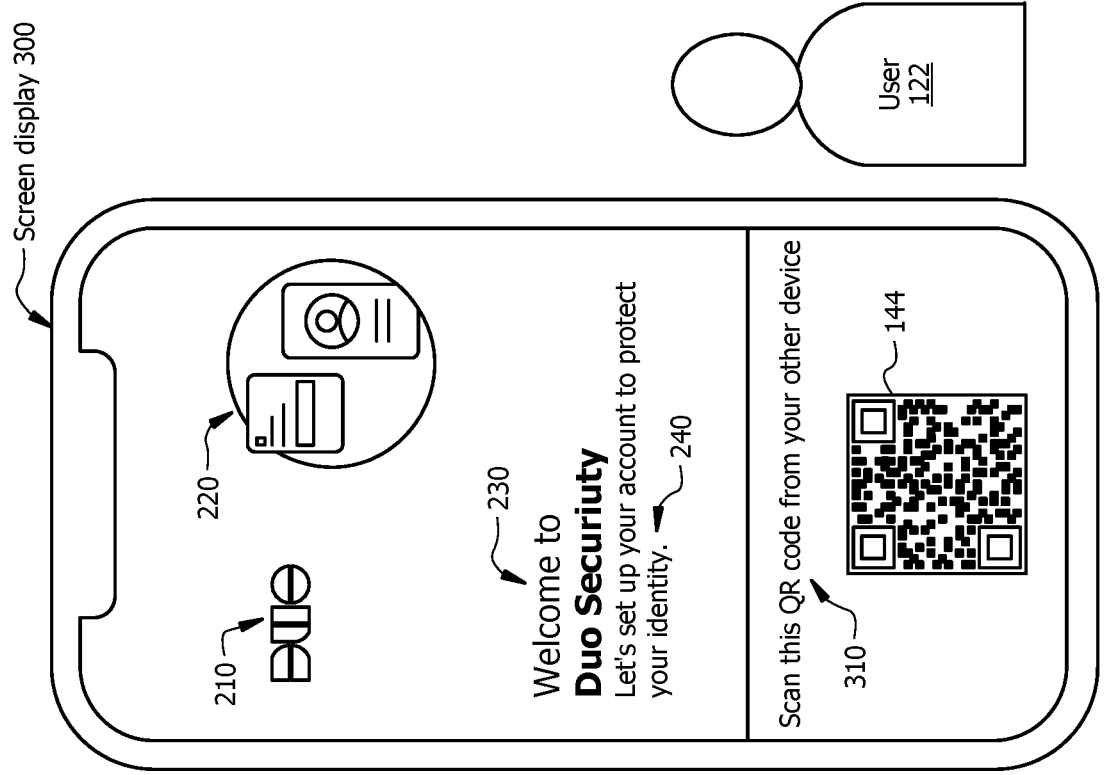
FIG. 3 illustrates another example screen display that may be used by the system of FIG. 1, in accordance with certain embodiments.

According to an embodiment, a first device includes one or more processors and one or more computer-readable non-transitory storage media coupled to the one or more processors and including instructions that, when executed by the one or more processors, cause the first device to perform operations. The operations include scanning a code from a second device and determining information comprising a peer identifier and a first certificate hash using the code. The operations also include initiating a connection with the second device using the peer identifier and receiving a second certificate hash from the second device via the connection. The operations further include validating the second certificate hash using the first certificate hash, establishing a session with the second device, and transferring account information to the second device via the session.

In accordance with certain embodiments, the code is a machine-readable image. In accordance with some embodiments, the connection is one of the following: a Transport Layer Security (TLS) connection, a Datagram TLS (DTLS) connection, or a Constrained Application Protocol (CoAP) connection.

In accordance with certain embodiments, the first certificate hash is generated by the first device by hashing a self-signed certificate. In some embodiments, an operating system of the first device is one of the following: an iPhone Operating System (iOS) or an Android OS. In certain embodiments, an operating system of the second device is one of the following: an iOS or an Android OS.

In accordance with some embodiments, the account information is associated with a mobile application installed on the first device. In certain embodiments, the account information comprises an identity of at least one third-party account. In some embodiments, the session is an encrypted, authenticated multi-party computation (MPC) session.

According to another embodiment, a method includes scanning, by a first device, a code from a second device and determining, by the first device, information comprising a peer identifier and a first certificate hash using the code. The method also includes initiating, by the first device, a connection with the second device using the peer identifier and receiving, by the first device, a second certificate hash from the second device via the connection. The method further includes validating, by the first device, the second certificate hash using the first certificate hash, establishing a session with the second device, and transferring, by the first device, account information to the second device via the session.

According to yet another embodiment, one or more computer-readable non-transitory storage media embody instructions that, when executed by a processor, cause the processor to perform operations. The operations include scanning, using a first device, a code from a second device and determining information comprising a peer identifier and a first certificate hash using the code. The operations also include initiating a connection with the second device using the peer identifier and receiving a second certificate hash from the second device via the connection. The operations further include validating the second certificate hash using the first certificate hash, establishing a session with the second device, and transferring account information to the second device via the session.

Technical advantages of certain embodiments of this disclosure may include one or more of the following. Certain embodiments of this disclosure allow users to securely transfer account information from an old device to a new device, which may reduce security and/or compliance risks. Certain embodiments of this disclosure improve end user productivity and experience by providing a secure way to transfer account information from one device to another that is compatible with both Android and iOS operating systems. Certain embodiments described herein are simple to use, deploy, and manage. Some embodiments of this disclosure increase efficiency in transferring account information by reducing user and/or management overhead.

Other technical advantages will be readily apparent to one skilled in the art from the following figures, descriptions, and claims. Moreover, while specific advantages have been enumerated above, various embodiments may include all, some, or none of the enumerated advantages.

Example Embodiments

This disclosure describes systems and methods for securely transferring account information between devices. For example, in the event a user purchases a new device (e.g., a smartphone), the user may establish a secure connection between their old device and the new device and transfer the account information using the secure connection. In certain embodiments, the new device generates a self-signed certificate and displays a code that includes hash of the self-signed certificate The old device detects the new device via a discovery process and scans the code displayed on the new device. The secure connection is then established between the old device and the new device, and the new device sends the hash of the self-signed certificate over the secure connection. Once the old device has the hash of the self-signed certificate, the user is able to complete the authentication process using the new device. The user can then securely transfer account information from the old device to the new device.

FIG. 1 illustrates an example system 100 for securely transferring account information between devices. System 100 or portions thereof may be associated with an entity, which may include any entity, such as a business, company, or enterprise, that transfers sensitive information between devices. In certain embodiments, the entity may be associated with a security organization, an authentication service provider, and the like. The components of system 100 may include any combination of hardware, firmware, and software. For example, the components of system 100 may use one or more elements of the computer system of FIG. 6. In the illustrated embodiment of FIG. 1, system 100 includes a network 110, devices 120 (a device 120a and a device 120b), a user 122, applications 130 (an application 130a and an application 130b), accounts 132 (account 132a and account 132b), third-party accounts 134 (third-party accounts 234a and third-party accounts 134b), account information 136 (account information 136a and account information 136b), peer discovery services 138 (a peer discovery service 138a and a peer discovery service 138b), a self-signed certificate 140, a certificate hash 142, a code 144, a peer identity 146, and a connection 150.

Network 110 of system 100 is any type of network that facilitates communication between components of system 100. Network 110 may connect one or more components of system 100. One or more portions of network 110 may include an ad-hoc network, the Internet, an intranet, an extranet, a virtual private network (VPN), an Ethernet VPN (EVPN), a local area network (LAN), a wireless LAN (WLAN), a virtual LAN (VLAN), a wide area network (WAN), a wireless WAN (WWAN), an SD-WAN, a metropolitan area network (MAN), a portion of the Public Switched Telephone Network (PSTN), a cellular telephone network, a Digital Subscriber Line (DSL), an Multiprotocol Label Switching (MPLS) network, a 3G/4G/5G network, a Long Term Evolution (LTE) network, a cloud network, a combination of two or more of these, or other suitable types of networks. Network 110 may include one or more different types of networks. Network 110 may be any communications network, such as a private network, a public network, a connection through the Internet, a mobile network, a Wi-Fi network, etc. Network 110 may include a core network, an access network of a service provider, an Internet service provider (ISP) network, and the like. One or more components of system 100 may communicate over network 110.

Network 110 may include one or more nodes. Nodes are connection points within network 110 that receive, create, store and/or send data along a path. Nodes may include one or more redistribution points that recognize, process, and forward data to other nodes of network 110. Nodes may include virtual and/or physical nodes. For example, nodes may include one or more physical devices, virtual machines, bare metal servers, and the like. As another example, nodes may include data communications equipment such as computers, routers, servers, printers, workstations, switches, bridges, modems, hubs, and the like. The nodes of network 110 may include one or more devices 120.

Devices 120 of system 100 include any user equipment that can receive, create, process, store, and/or communicate information. Devices 120 may include one or more mobile phones (e.g., smartphones), laptop computers, tablets, personal digital assistants (PDAs), tablets, wearable devices, workstations, desktop computers, and the like. In certain embodiments, one or more devices 120 may include a liquid crystal display (LCD), an organic light-emitting diode (OLED) flat screen interface, digital buttons, a digital keyboard, physical buttons, a physical keyboard, one or more touch screen components, a graphical user interface (GUI), and the like. Devices 120 may be located in any suitable locations to receive and communicate information to user 122 of system 100. Devices 120 may include local devices, remote devices, wireless devices, and the like.

In the illustrated embodiment of FIG. 1, devices 120 include device 120a and device 120b. In certain embodiments, device 120a and device 120b are the same type of device 120. For example, device 120a and device 120b may both be mobile phones. In some embodiments, device 120a and device 120b are different types of devices 120. For example, device 120a may be a mobile phone, and device 120b may be a tablet.

In certain embodiments, each device 120 of system 100 is associated with one or more operating systems. Operating systems include Android (Google), iOS (Apple), Bada (Samsung), Blackberry OS (Research in Motion), Windows OS (Microsoft), Symbian OS (Nokia), Tizen (Samsung), and the like. In certain embodiments, device 120a and device 120b run the same operating system. For example, device 120a and device 120b may both run iOS. As another example, device 120a and device 120b may both run Android. In some embodiments, device 120a and device 120b run different operating systems. For example, device 120a may run iOS, and device 120b may run Android.

Devices 120 of system 100 are associated with user 122. User 122 is a person or group of persons who utilize one or more devices 120 of system 100. User 122 may be associated with one or more accounts (e.g., a security account). User 122 may be a local user, a remote user, an administrator, a customer, a company, a combination thereof, and the like. User 122 may be associated with a username, a password, a user profile, etc.

Each device 120 of system 100 runs one or more applications 130. Applications 130 are computer software packages that perform specific functions for user 122 or for another application. Each application 130 may be self-contained or may be a group of programs. Applications 130 may be associated with one or more of the following: a security application, an authentication application, content access software, a database management application, an email application, a web browser, a gaming application, word processors, enterprise software, accounting software, graphics software, media players, and the like.

In certain embodiments, one or more applications 130 are mobile applications (also known as mobile apps). Mobile applications are designed to run on mobile devices (e.g., a smartphone, a tablet, a PDA, etc.). Applications 130 may include native applications and/or web applications. Native applications are built for a specific mobile operating system (e.g., iOS or Android), whereas web applications are run through a browser.

In the illustrated embodiment of FIG. 1, application 130a is associated with device 120a, and application 130b is associated with device 120b. In certain embodiments, application 130 and application 130b are the same type of application 130. For example, application 130a may be an authentication application (e.g., Duo Mobile), and application 130b may also be the authentication application (e.g., Duo Mobile).

In certain embodiments, applications 130 may include one or more applications related to security and or authentication. For example, one or more applications 130 may provide authentication and verification by generating one or more security code. As another example, one or more applications 130 may generate a one-time code that user 122 can use to confirm that they are logging in to a website or service. In certain embodiments, one or more applications 130 may be associated with and/or provide two-factor authentication (2 FA).

In some embodiments, one or more applications 130 are associated with one or more accounts 132. Accounts 132 may include user accounts that are required for access, authentication and/or authorization to certain online services. In certain embodiments, one or more accounts 132 may require a username and/or password to log in to their respective applications 130. In the illustrated embodiment of FIG. 1, account 132a is associated with application 130a, and account 132b is associated with application 130b. In certain embodiments, application 130a and/or application 130b may require user 122 to create associated account 132a or associated account 132b, respectively. For example, application 130a may prompt user 122 to create associated account 132a to personalize application 130a to user 122.

In some embodiments, one or more applications 130 are associated with one or more third-party accounts 134. Third-party accounts 134 are other accounts associated with user 122 such as online services, web applications, and the like. In certain embodiments, third-party accounts 134 are manually added by user 122. Examples of third-party accounts 134 include Instagram accounts, Facebook accounts, Snapchat accounts, DropBox accounts, Amazon accounts, Google accounts, etc. in the illustrated embodiment of FIG. 1, third party accounts 134 include third-party accounts 134a associated with device 120a and third-party accounts 134b associated with device 120b. In certain embodiments, application 130a and/or application 130b allow user 122 to protect third-party accounts 134a and/or third-party accounts 134b, respectively, with a code (e.g., a mobile-generated passcode). This may allow user 122 to keep one or more of their third-party accounts 134 in one application 130.

Accounts 132 and third-party accounts 134 of system 100 are each associated with account information 136. Account information may include sign-in information (e.g., usernames, passwords, etc.), contact information (email addresses, phone numbers, etc.), personal information (e.g., photos, names, gender, dates of birth, etc.), and the like. In certain embodiments, account information 136 includes information or data that upon unauthorized access may adversely affect the privacy or welfare of an individual or organization. Account information 136 may include sensitive information such as confidential information, classified information, personal information, private information, and the like. Examples of sensitive information include financial account information (e.g., a bank account number), health information (e.g., prescription information), personally identifiable information (e.g., a name, email address, phone number, government-issued ID number), etc.

In certain embodiments, account information 136 is directly associated with user 122. For example, account information 136 may include a name of user 122, a username and/or password of user 122, a profile of user 122, and the like. In the illustrated embodiment of FIG. 1, account information includes account information 136a associated with accounts 132a and/or third-party accounts 134a of device 120a and account information 136b associated with accounts 132b and/or third-party accounts 134b of device 120b.

In certain embodiments, user 122 may want to transfer account information 136b from device 120b (e.g., an old device) to device 120a (e.g., a new device). To transfer account information 136 between devices 120, devices 120 securely communicate with one another. In certain embodiments, one or more devices 120 use one or more peer discovery services 138 (peer discovery service 138a and peer discovery service 138b) to find other devices 120 in network 110. Peer discovery is the process of locating nodes (e.g., peers) for data communication in network 110 (e.g., a peer-to-peer (P2P) network). In certain embodiments, peer discovery services 138 are performed by P2P clients, which use protocols and/or other network communication techniques to find peers within local and remote networks 110. In some embodiments, a multipeer connectivity framework (e.g., Apple's Multipeer Connectivity framework) is used. The multipeer connectivity framework supports the discovery of services provided by nearby devices 120. In certain embodiments, the multipeer connectivity framework supports communicating with those services through message-based data, streaming data, resources (such as files), etc. In some embodiments, the framework may use infrastructure such as Wi-Fi networks, P2P Wi-Fi, Bluetooth, personal area networks, etc. for the underlying transport. In the illustrated embodiment of FIG. 1, device 120a uses peer discovery service 138a, and device 120b uses peer discovery service 138b.

In certain embodiments, device 120a generates self-signed certificate 140. Self-signed certificate 140 is a public key certificate that user 122 issues on its own behalf (rather than a certificate issued by a certificate authority (CA)). The digital signature of self-signed certificate 140 may be verified by the public key included within self-signed certificate 140. Device 120a may generate self-signed certificate 140 using one or more tools such as Open Secure Sockets Layer (SSL), BoringSSL, Java's keytool, Adobe Reader, wolfSSL, Apple's Keychain, and the like.

In certain embodiments, device 120a generates certificate hash 142 of self-signed certificate 140. Certificate hash 142 is a value (such as a digest) that is returned by a hash function. In some embodiments, device 120a generates certificate hash 142 using a secure cryptographic function. The secure cryptographic function may be a cryptographic hash function such as a Secure Hashing Algorithm (SHA) (e.g., SHA-1, SHA-2, SHA-3, SHA-256, SHA-512, etc.)), a Message Digest Algorithm (MD) (e.g., MD-2, MD-3, etc.), Skein, Snefru, Spectral Hash, Streebog, SWIFFT, and the like.

In certain embodiments, device 120a generates code 144. Code 144 is a machine-readable code that represents data in a visual, machine-readable form. Code 144 may be a Quick Response (QR) code, a matrix barcode, a two-dimensional (2D) barcode, a three-dimensional (3D) barcode, a linear barcode, and the like. In some embodiments, code 144 includes certificate hash 142 and peer identity 1464. Peer identity 146 (e.g., PeerId) is a unique reference to a specific peer within peer-to-peer network 110. In certain embodiments, peer identity 146 uniquely identifies a peer in network 110. In some embodiments, peer identity 146 is a verifiable link between a peer and its public cryptographic key. For example, in the illustrated embodiment of FIG. 1, peer identity 146 may uniquely identify device 122a and/or may provide a verifiable link between device 122a and its public cryptographic key.

In some embodiments, device 120a presents code 144 for presentation in visual or tactile form to user 122. For example, device 120a may present code 144 to user 122 via a display (e.g., screen display 300 of FIG. 3) of device 120a. The display of device 120a may include any type of output surface that shows text, graphic images, etc. to user 122 via a cathode ray tube (CRT), liquid crystal display (LCD), light-emitting diode, gas plasma, or other image projection technology. In certain embodiments, device 120b of system 100 detects device 120a through one or more peer discovery services 138 and captures code 144 presented by device 120a. For example, device 120b may scan code 144 (e.g., a QR code) that is displayed on device 120a using a camera application. In certain embodiments, device 120b translates code 144 to obtain certificate hash 142, peer identity 146, and any other information included in code 144. In some embodiments, device 120b stores certificate hash 142, peer identity 146, and any other information obtained from code 144 in its memory.

In certain embodiments, device 120b uses peer identity 146 to establish connection 150 between device 120b and device 120a. Connection 150 uses one or more protocols to provide end-to-end security of data sent between two devices 120. Connection 150 may be a TLS connection, a DTLS connection, a CoAP connection, or any other suitable type of connection 150. Connection 150 may be generated between two Android devices 120, two iOS devices 120, Android device 120a and iOS device 120b, or any other suitable combination. In some embodiments, connection 150 is generated between two iOS devices 120. For example, iOS device 120a may communicate with iOS device 120b via Wi-Fi to establish connection 150.

In some embodiments, once connection 150 is established between device 120a and device 120b, device 120a communicates self-signed certificate 140 to device 120b via connection 150. For example, device 120a may communicate certificate hash 142 to device 12b via secure DTLS connection 150. In certain embodiments, device 120b receives certificate hash 142 from device 120a via connection 150 and compares certificate hash 142 received via connection 150 to certificate hash 142 previously received via code 144. If certificate hash 142 received via connection 150 and certificate hash 142 previously received via code 144 match, device 120b validates device 120a. Device 120b then securely communicates account information 136b to device 120a.

In operation, device 120a of system 100 advertises peer discovery service 138a to other peers. Device 120a generates self-signed certificate 140 and hashes self-signed certificate 140 to create certificate hash 142. Device 120a then generates code 144 by combining peer identity 146 and certificate hash 142 and displays code 144 on its display screen. Device 120b detects advertised peer discovery service 138a and prompts user 122 to scan code 144 displayed on device 120a. User 122 uses device 120b to scan code 144, translates code 144 to resolve peer identity 146 and certificate hash 142, and stores peer identity 146 and certificate hash 142. Device 120b initiates connection 150 using peer identity 146, and device 120a communicates certificate hash 142 to user 122 via connection 150. Device 120b compares certificate hash 142 received via connection 150 to certificate hash 142 previously received from scanning code 144. If both certificate hashes 142 match, device 120b validates certificate hash 142 and establishes an encrypted, authenticated session with device 120a. Device 120b can then begin transferring account information 136b associated with account 132b and/or third-party accounts 134b to device 120a. As such, system 100 may be used to securely transfer account information 136 from one device 120 to another.

Although FIG. 1 illustrates a particular number of networks 110, devices 120, users 122, applications 130, accounts 132, third-party accounts 134, account information 136, peer discovery services 138, self-signed certificates 140, certificate hashes 142, codes 144, peer identities 146, and connections 150, this disclosure contemplates any suitable number of networks 110, devices 120, users 122, applications 130, accounts 132, third-party accounts 134, account information 136, peer discovery services 138, self-signed certificates 140, certificate hashes 142, codes 144, peer identities 146, and connections 150.

Although FIG. 1 illustrates a particular arrangement of network 110, devices 120 (device 120a and device 120b), user 122, applications 130 (application 130a and application 130b), accounts 132 (account 132a and account 132b), third-party accounts 134 (e.g., third-party account 134a and third-party account 134b), account information 136 (account information 136a and account information 136b), peer discovery services 138 (peer discovery service 138 and peer discovery service 1386b), self-signed certificate 140, certificate hash 142, code 144, peer identity 146, and connection 150, this disclosure contemplates any suitable arrangement of network 110, devices 120 (device 120a and device 120b), user 122, applications 130 (application 130a and application 130b), accounts 132 (account 132a and account 132b), third-party accounts 134 (e.g., third-party account 134a and third-party account 134b), account information 136 (account information 136a and account information 136b), peer discovery services 138 (peer discovery service 138 and peer discovery service 1386b), self-signed certificate 140, certificate hash 142, code 144, peer identity 146, and connection 150.

Furthermore, although FIG. 1 describes and illustrates particular components, devices, or systems carrying out particular actions, this disclosure contemplates any suitable combination of any suitable components, devices, or systems carrying out any suitable actions.

Figure 2:
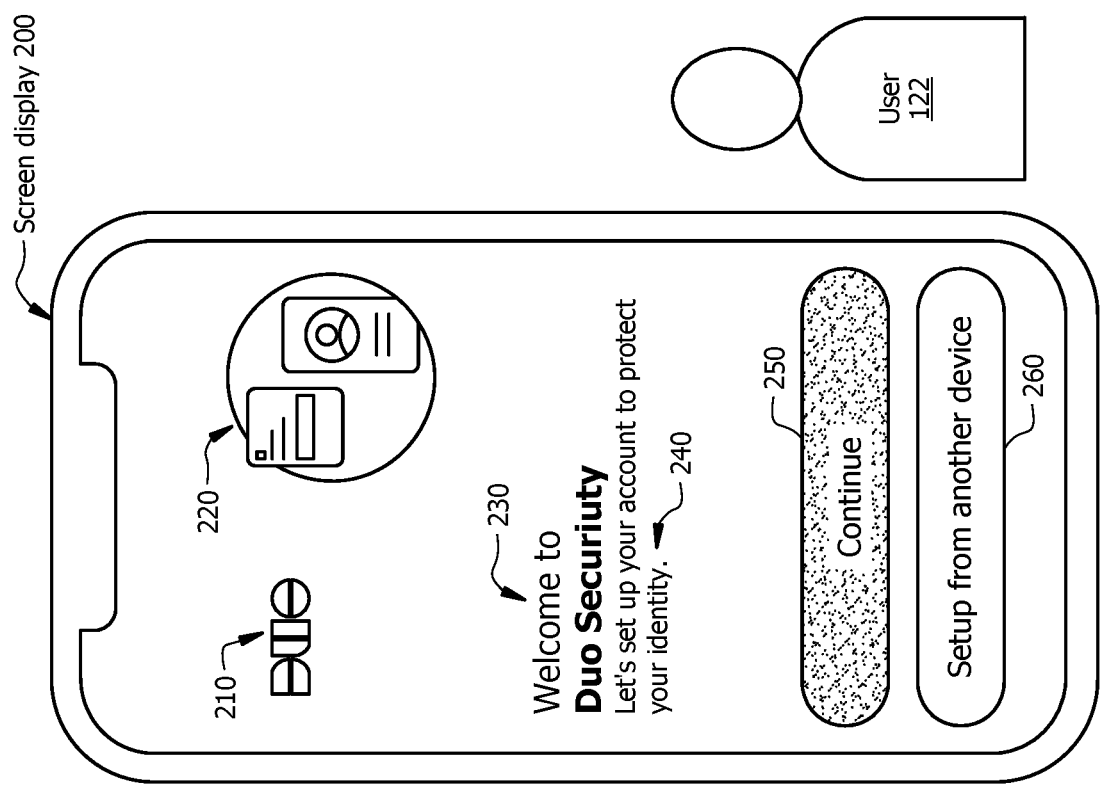
FIG. 2 illustrates an example screen display that may be used by the system of FIG. 1, in accordance with certain embodiments.

FIG. 2 illustrates an example screen display 200 that may be used by system 100 of FIG. 1. Screen display 200 is generated from application 130a of device 120a of FIG. 1. Screen display 200 includes a logo 210 associated with the entity (e.g., Duo Security) providing application 130a, an illustration 220 associated with the entity providing application 130a, a welcome message 230 ("Welcome to Duo Security"), an introduction message 240 ("Let's set up your account to protect your identity"), a first option 250 ("Continue"), and a second option 260 ("Setup from another device").

First option 250 of FIG. 2 is designed for user 122 to set up account 132a of FIG. 1 for application 130a (e.g., Duo Security). Second option 260 of FIG. 2 is designed for user 122 to set up account 132a of FIG. 1 using device 120b of FIG. 1. For example, second option 260 may allow user 122 to transfer account information 136b associated with account 132b and/or third-party accounts 134b of device 120b to account 132a of device 120a of FIG. 1. In certain embodiments, selecting (e.g., tapping on) second option 260 ("Setup from another device") generates code 144, as illustrated in FIG. 3.

Although FIG. 2 illustrates a particular number of users 122, screen displays 200, logos 210, illustrations 220, welcome messages 230, introduction messages 240, options 250, and options 260, this disclosure contemplates any suitable number of users 122, screen displays 200, logos 210, illustrations 220, welcome messages 230, introduction messages 240, options 250, and options 260. Although FIG. 2 illustrates a particular arrangement of user 122, screen display 200, logo 210, illustration 220, welcome message 230, introduction message 240, option 250, and option 260, this disclosure contemplates any suitable arrangement of user 122, screen display 200, logo 210, illustration 220, welcome message 230, introduction message 240, option 250, and option 260. Furthermore, although FIG. 2 describes and illustrates particular components, devices, or systems carrying out particular actions, this disclosure contemplates any suitable combination of any suitable components, devices, or systems carrying out any suitable actions.

FIG. 3 illustrates another example screen display 300 that may be used by system 100 of FIG. 1. Screen display 300 is generated from application 130a of FIG. 1. Screen display 300 includes logo 210 associated with the entity (e.g., Duo Security) providing application 130a, illustration 220 associated with the entity providing application 130a, welcome message 230 ("Welcome to Duo Security"), introduction message 240 ("Let's set up your account to protect your identity."), instructional message 310 ("Scan this QR code from your other device"), and code 144. Code 144 is described in FIG. 1. While code 144 in the embodiment of FIG. 3 illustrates a particular type of code 144 (a QR code), this disclosure contemplates any suitable type of code. Code 144 is generated upon device 120a receiving an input from user 122. In certain embodiments, code 144 is generated upon user 122 selecting (e.g., tapping) second option 260 from FIG. 2.

In some embodiments, user 122 scans code 144 displayed on device 120a using device 120b. For example, user 122 may scan code 144 displayed on device 120a using a camera application. In response to scanning code 144, device 120b may deep-link (e.g., as a universal link) into application 130a (e.g., Duo Mobile) and initiate an authentication process. Once the authentication process is complete, device 120a establishes a session with device 120b. Device 120b can then begin the process of transferring account information (see account information 136b of FIG. 1) to device 120a via the established session.

Although FIG. 3 illustrates a particular number of users 122, screen displays 300, logos 210, illustrations 220, welcome messages 230, introduction messages 240, instructional messages 310, and codes 144, this disclosure contemplates any suitable number of users 122, screen displays 300, logos 210, illustrations 220, welcome messages 230, introduction messages 240, instructional messages 310, and codes 144. Although FIG. 3 illustrates a particular arrangement of user 122, screen display 300, logo 210, illustration 220, welcome message 230, introduction message 240, instructional message 310, and code 144, this disclosure contemplates any suitable arrangement of user 122, screen display 300, logo 210, illustration 220, welcome message 230, introduction message 240, instructional message 310, and code 144. For example, code 144 may be illustrated as a different type of code. As another example, code 144 may be located near the top of screen display 300 rather than near the bottom. Furthermore, although FIG. 3 describes and illustrates particular components, devices, or systems carrying out particular actions, this disclosure contemplates any suitable combination of any suitable components, devices, or systems carrying out any suitable actions.

Figure 4:
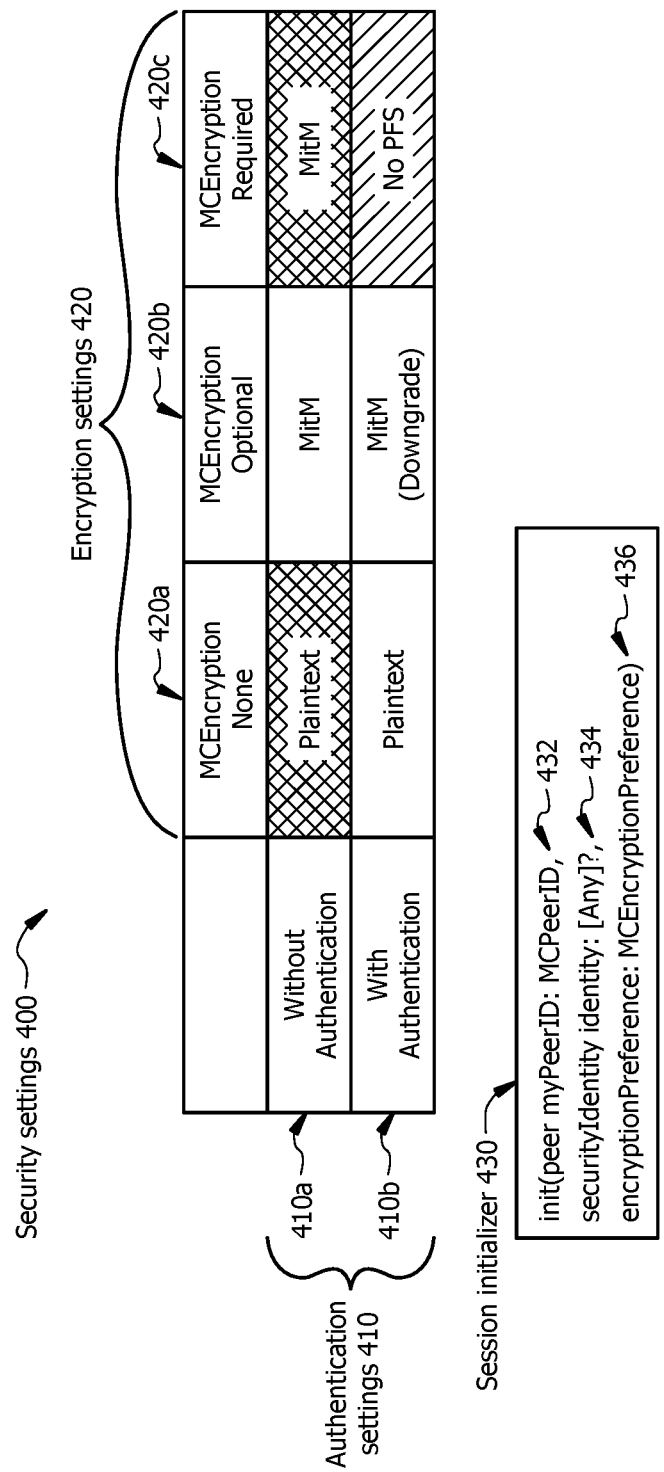
FIG. 4 illustrates example security settings that may be used by the system of FIG. 1, in accordance with certain embodiments.

FIG. 4 illustrates example security settings 400 that may be available when configurating a multi-peer session between devices. In certain embodiments, devices 120 of FIG. 1 use a multipeer connectivity framework (e.g., Apple's Multipeer Connectivity framework) for peer discovery services 138. The multipeer connectivity framework supports the discovery of services provided by nearby devices and supports communicating with those services through message-based data, streaming data, resources (such as files), etc. In iOS, the framework may use Wi-Fi networks, peer-to-peer Wi-Fi, Bluetooth, personal area networks, and the like for the underlying transport. In certain embodiments, the protocol used for data exchange (the "session phase") is a UDP-based protocol wrapped in DTLS.

Security settings 400 of FIG. 4 include authentication settings 410 and encryption settings 420. Authentication settings 410 are used to establish a peer's identity. Encryption settings 420 are used to secure the channel between the peers. Authentication settings 410 include without authentication settings 410a and with authentication settings 410b. Encryption settings 420 include without encryption settings 420a (e.g., "MCEncryptionNone"), optional encryption settings 420b (e.g., "MCEncryptionOptional"), and required encryption settings 420c ("MCEncryptionRequired"). Security settings 400 may be set by a developer, a programmer, a user, an administrator, etc. For example, security settings 400 of application 130a of FIG. 1 may be set by a developer of application 130a.

In certain embodiments, security settings 400 control which type of connection used (e.g., whether DTLS is used), which cipher suites enabled (e.g., the list of cipher suites enabled during the DTLS handshake), and the like. In certain embodiments, enabling authentication (see 410b) causes the protocol to perform a mutually-authenticated handshake. For example, enabling authentication may cause the protocol to perform a mutually-authenticated DTLS handshake such that each side/peer exchanges their certificate.

In certain embodiments, disabling authentication (see 410a) with encryption enabled (see 420b and 420c) may result in the usage of Anonymous TLS cipher suites (i.e., no certificates get exchanged), which are vulnerable to man-in-the-middle attacks (indicated as "MitM" in FIG. 4). Disabling both authentication (see 410a) and encryption (see 420a) switches DTLS off, in which case the plaintext User Datagram Protocol (UDP) protocol is directly used. Enabling authentication (see 410b) and setting encryption to optional (see 420b) is vulnerable to downgrade attacks. Downgrade attacks are attacks that attempt to cause a connection, protocol, cryptographic algorithm, and the like to drop to an older and/or less secure version.

To minimize security concerns, enabling both session authentication (see 410b) and encryption (see 420c) is preferred. Encryption may be enabled by flipping Boolean on when starting a session. For iOS devices, Apple supports authentication of MCSessions via an MCSession initializer 430. MCSession initializer 430 includes a peer identifier 432, an identity 434, and an encryption preference 436.

Peer identifier 432 (e.g., "MCPeerID") is a local identifier that represents the device (e.g., device 120a of FIG. 1) on which the application is currently running. Identity 434 is an array that includes information that can be used to identify the local peer (e.g., device 120a of FIG. 1) to other nearby peers (e.g., device 120b of FIG. 1). For iOS devices, Apple expects the first object in this array to include a security identity (e.g., "SecIdentity") object that provides the local peer's identity. In certain embodiments, the SecIdentity includes a key (SecKey) and a (public) certificate (SecCertificate).

SecKey is a core foundation-based abstraction around a security key stored in a keychain. In certain embodiments, SecKey is generated for private key functionality in applications 130 (e.g., DuoMobile applications). For example, application 130a of device 120a of FIG. 1 may generate a Rivest-Shamir-Adleman (RSA) key (e.g., a 2048-bit RSA key). For iOS devices, Apple provides built-in mechanisms for generating these keys via built-ins such as SecKey CreateRandomKey.

A SecCertificate is a core foundation-based abstraction representing an X.509 certificate. For iOS devices, Apple provides mechanisms to create a SecCertificate instance via loading a raw data representation of such a certificate. This leaves two options: (1) provide and deploy certificates/ private keys on every device, which present a high security risk: or (2) generate a self-signed certificate (along with the private key) on device 120b, which is preferred.

For iOS devices, Apple expects the remainder of the array to include any additional intermediate certificate objects. The intermediate certificate objects may include one or more security certificate (e.g., "SecCertificate") objects that provide any intermediate certificates that nearby peers might require when verifying the identity of the local peer.

When a peer (e.g., device 120b of FIG. 1) is added to the session, the peer receives the certificate of the local peer (e.g., device 120a of FIG. 1) and any other additional certificates provided to the local peer. In certain embodiments, the local peer's certificate is extracted from the provided identity. The receiving peer may then validate that certificate. Encryption preference 436 (e.g., "encryptionPreference") is an integer value that indicates whether encryption is required, preferred, undesirable, etc.

Apple provides no built-in mechanisms for generating X.509 certificates for scenarios. An X.509 signed, Distinguished Encoding Rules (DER) encoded certificate on devices 120 can be generated and/or signed by: (1) implementing its own X.509 certificate creation code: or (2) leveraging Open Secure Sockets Layer (OpenSSL) and/or BoringSSL, which provides an application programming interface (API) to generate such certificates. Option (2) is preferred.

Although FIG. 4 illustrates a particular number of security settings 400, authentication settings 410, encryption settings 420, session initializers 430, peer identifiers 432, identities 434, and encryption preferences 436, this disclosure contemplates any suitable number of security settings 400, authentication settings 410, encryption settings 420, session initializers 430, peer identifiers 432, identities 434, and encryption preferences 436. Although FIG. 4 illustrates a particular arrangement of security settings 400, authentication settings 410, encryption settings 420, session initializer 430, peer identifier 432, identity 434, and encryption preference 436, this disclosure contemplates any suitable arrangement of security settings 400, authentication settings 410, encryption settings 420, session initializer 430, peer identifier 432, identity 434, and encryption preference 436. Furthermore, although FIG. 4 describes and illustrates particular components, devices, or systems carrying out particular actions, this disclosure contemplates any suitable combination of any suitable components, devices, or systems carrying out any suitable actions.

Figure 5:
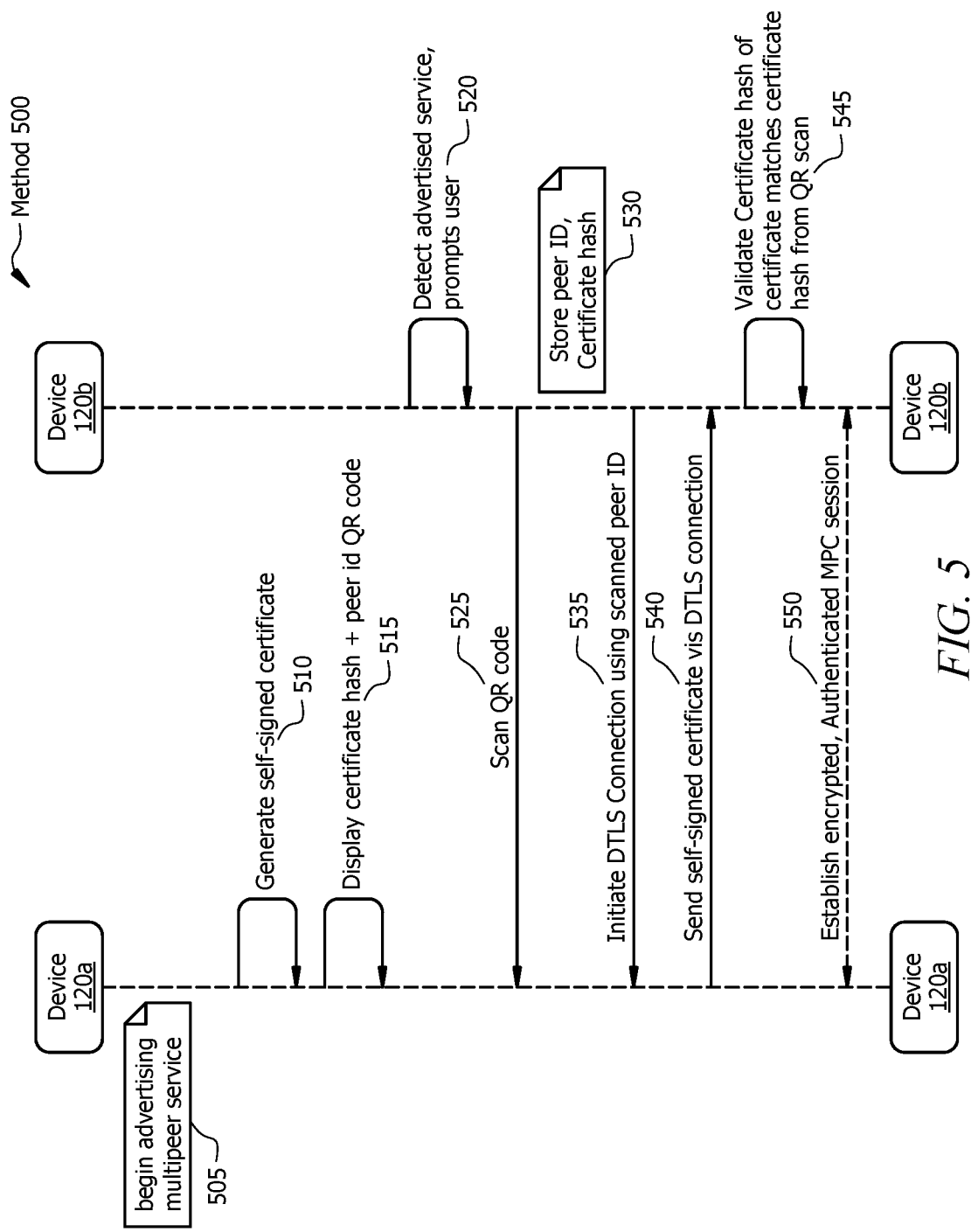
FIG. 5 illustrates an example method for securely transferring account information between devices, in accordance with certain embodiments.

FIG. 5 illustrates an example method 500 for securely transferring account information between devices. FIG. 5 includes actions performed by device 120a and device 120b of FIG. 1. Method 500 begins at step 505, where device 120a begins advertising a multi-peer service (e.g., peer discovery service 138a of FIG. 1). For example, device 120a may advertise its ability to discover services provided by nearby devices. In certain embodiments, device 120a advertises its support for communicating with those services through message-based data, streaming data, resources (e.g., files), and the like. In certain embodiments, device 120a may use a multi-peer connectivity framework that relies on infrastructure such as Wi-Fi networks, P2P Wi-Fi, Bluetooth, personal area networks, etc. for the underlying transport. Method 500 then moves from step 505 to step 510.

At step 510 of method 500, device 120a generates a self-signed certificate (e.g., self-signed certificate 140 of FIG. 1). For example, device 120a may use OpenSSL and/or BoringSSL, which provides an API to generate the self-signed certificate. In certain embodiments, device 120a generates a self-signed X.509 certificate and/or creates a security certificate (e.g., a SecCertificate), which can then be used to create an identity (e.g., identity 434 of FIG. 4) for use on iOS. Method 500 then moves from step 510 to step 515.

At step 515 of method 500, device 120a displays a code. For example, referring to FIG. 3, device 120a may present code 144 on screen display 300. In the illustrated embodiment of FIG. 5, the code is a QR code that includes a SHA-256 hash of the self-signed certificate (see certificate hash 142 of FIG. 1) and a peer identity (see peer identity 146 of FIG. 1). Method 500 then moves from step 515 to step 520, where device 120b detects the multi-peer service advertised by device 120a and prompts the user (e.g., user 122 of FIG. 3) to scan the QR code. At step 525 of method 500, device 120b scans the QR code using, as an example, a camera application. Method 500 then moves from step 525 to step 530, where device 120b stores the peer identifier and the SHA-256 certificate hash in its memory. Method 500 then moves from step 530 to step 535.

At step 535 of method 500, device 120b initiates a connection (see connection 150 of FIG. 1) using the scanned peer identifier. In the illustrated embodiment of FIG. 5, the connection is a DLTS connection. Method 500 then moves from step 535 to step 540, where device 120a communicates the self-signed certificate that it previously generated at step 510 to device 120b via the connection. At step 545 of method 500, device 120b determines whether the certificate hash received via the connection matches the certificate hash received from the previous scan. If the certificate hash received via the connection matches the certificate hash received from the previous scan, device 120b validates the certificate hash. Method 500 then moves from step 545 to step 550, where an encrypted, authenticated connection is established. Device 120b can then begin securely transferring account information (e.g., account information 136b of FIG. 1) to device 120a. If, at step 545, the certificate hash received via the connection does not match the certificate hash received from the previous scan, device 120b does not validate the certificate hash and the encrypted, authenticated session is not established. As such, method 500 provides a secure and efficient way transfer account information from one device to another.

Although this disclosure describes and illustrates particular steps method 500 of FIG. 5 as occurring in a particular order, this disclosure contemplates any suitable steps of method 500 of FIG. 5 occurring in any suitable order. Although this disclosure describes and illustrates an example method for securely transferring account information between devices including the particular steps of the method of FIG. 5, this disclosure contemplates any suitable method for transferring account information between devices including any suitable steps, which may include all, some, or none of the steps of the method of FIG. 5, where appropriate. Furthermore, although FIG. 5 describes and illustrates particular components, devices, or systems carrying out particular actions, this disclosure contemplates any suitable combination of any suitable components, devices, or systems carrying out any suitable actions.

Figure 6:
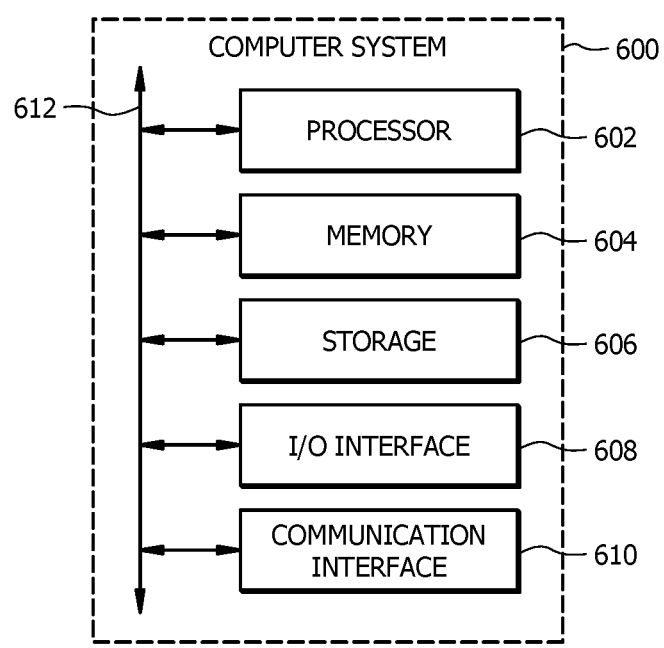
FIG. 6 illustrates an example computer system that may be used by the systems and methods described herein, in accordance with certain embodiments.

FIG. 6 illustrates an example computer system 600. In particular embodiments, one or more computer system 600 perform one or more steps of one or more methods described or illustrated herein. In particular embodiments, one or more computer system 600 provide functionality described or illustrated herein. In particular embodiments, software running on one or more computer system 600 performs one or more steps of one or more methods described or illustrated herein or provides functionality described or illustrated herein. Particular embodiments include one or more portions of one or more computer system 600. Herein, reference to a computer system may encompass a computing device, and vice versa, where appropriate. Moreover, reference to a computer system may encompass one or more computer systems, where appropriate.

This disclosure contemplates any suitable number of computer system 600. This disclosure contemplates computer system 600 taking any suitable physical form. As example and not by way of limitation, computer system 600 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 600 may include one or more computer system 600: be unitary or distributed: span multiple locations: span multiple machines: span multiple data centers: or reside in a cloud, which may include one or more cloud components in one or more networks. Where appropriate, one or more computer system 600 may perform without substantial spatial or temporal limitation one or more steps of one or more methods described or illustrated herein. As an example and not by way of limitation, one or more computer system 600 may perform in real time or in batch mode one or more steps of one or more methods described or illustrated herein. One or more computer system 600 may perform at different times or at different locations one or more steps of one or more methods described or illustrated herein, where appropriate.

In particular embodiments, computer system 600 includes a processor 602, memory 604, storage 606, an input/output (I/O) interface 608, a communication interface 610, and a bus 612. Although this disclosure describes and illustrates a particular computer system having a particular number of particular components in a particular arrangement, this disclosure contemplates any suitable computer system having any suitable number of any suitable components in any suitable arrangement.

In particular embodiments, processor 602 includes hardware for executing instructions, such as those making up a computer program. As an example and not by way of limitation, to execute instructions, processor 602 may retrieve (or fetch) the instructions from an internal register, an internal cache, memory 604, or storage 606: decode and execute them; and then write one or more results to an internal register, an internal cache, memory 604, or storage 606. In particular embodiments, processor 602 may include one or more internal caches for data, instructions, or addresses. This disclosure contemplates processor 602 including any suitable number of any suitable internal caches, where appropriate. As an example and not by way of limitation, processor 602 may include one or more instruction caches, one or more data caches, and one or more translation lookaside buffers (TLBs). Instructions in the instruction caches may be copies of instructions in memory 604 or storage 606, and the instruction caches may speed up retrieval of those instructions by processor 602. Data in the data caches may be copies of data in memory 604 or storage 606 for instructions executing at processor 602 to operate on: the results of previous instructions executed at processor 602 for access by subsequent instructions executing at processor 602 or for writing to memory 604 or storage 606: or other suitable data. The data caches may speed up read or write operations by processor 602. The TLBs may speed up virtual-address translation for processor 602. In particular embodiments, processor 602 may include one or more internal registers for data, instructions, or addresses. This disclosure contemplates processor 602 including any suitable number of any suitable internal registers, where appropriate. Where appropriate, processor 602 may include one or more arithmetic logic units (ALUs): be a multi-core processor: or include one or more processors 602. Although this disclosure describes and illustrates a particular processor, this disclosure contemplates any suitable processor.

In particular embodiments, memory 604 includes main memory for storing instructions for processor 602 to execute or data for processor 602 to operate on. As an example and not by way of limitation, computer system 600 may load instructions from storage 606 or another source (such as, for example, another computer system 600) to memory 604. Processor 602 may then load the instructions from memory 604 to an internal register or internal cache. To execute the instructions, processor 602 may retrieve the instructions from the internal register or internal cache and decode them. During or after execution of the instructions, processor 602 may write one or more results (which may be intermediate or final results) to the internal register or internal cache. Processor 602 may then write one or more of those results to memory 604. In particular embodiments, processor 602 executes only instructions in one or more internal registers or internal caches or in memory 604 (as opposed to storage 606 or elsewhere) and operates only on data in one or more internal registers or internal caches or in memory 604 (as opposed to storage 606 or elsewhere). One or more memory buses (which may each include an address bus and a data bus) may couple processor 602 to memory 604. Bus 612 may include one or more memory buses, as described below. In particular embodiments, one or more memory management units (MMUs) reside between processor 602 and memory 604 and facilitate accesses to memory 604 requested by processor 602. In particular embodiments, memory 604 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 604 may include one or more memories 604, where appropriate.

Although this disclosure describes and illustrates particular memory, this disclosure contemplates any suitable memory.

In particular embodiments, storage 606 includes mass storage for data or instructions. As an example and not by way of limitation, storage 606 may include a hard disk drive (HDD), a floppy disk drive, flash memory, an optical disc, a magneto-optical disc, magnetic tape, or a Universal Serial Bus (USB) drive or a combination of two or more of these. Storage 606 may include removable or non-removable (or fixed) media, where appropriate. Storage 606 may be internal or external to computer system 600, where appropriate. In particular embodiments, storage 606 is non-volatile, solid-state memory. In particular embodiments, storage 606 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 606 taking any suitable physical form. Storage 606 may include one or more storage control units facilitating communication between processor 602 and storage 606, where appropriate. Where appropriate, storage 606 may include one or more storages 606. Although this disclosure describes and illustrates particular storage, this disclosure contemplates any suitable storage.

In particular embodiments, I/O interface 608 includes hardware, software, or both, providing one or more interfaces for communication between computer system 600 and one or more I/O devices. Computer system 600 may include one or more of these I/O devices, where appropriate. One or more of these I/O devices may enable communication between a person and computer system 600. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 608 for them. Where appropriate, I/O interface 608 may include one or more device or software drivers enabling processor 602 to drive one or more of these I/O devices. I/O interface 608 may include one or more I/O interfaces 608, where appropriate. Although this disclosure describes and illustrates a particular I/O interface, this disclosure contemplates any suitable I/O interface.

In particular embodiments, communication interface 610 includes hardware, software, or both providing one or more interfaces for communication (such as, for example, packet-based communication) between computer system 600 and one or more other computer system 600 or one or more networks. As an example and not by way of limitation, communication interface 610 may include a network interface controller (NIC) or network adapter for communicating with an Ethernet or other wire-based network or a wireless NIC (WNIC) or wireless adapter for communicating with a wireless network, such as a Wi-Fi network. This disclosure contemplates any suitable network and any suitable communication interface 610 for it. As an example and not by way of limitation, computer system 600 may communicate with an ad hoc network, a personal area network (PAN), a LAN, a WAN, a MAN, or one or more portions of the Internet or a combination of two or more of these. One or more portions of one or more of these networks may be wired or wireless. As an example, computer system 600 may communicate with a wireless PAN (WPAN) (such as, for example, a BLUETOOTH WPAN), a Wi-Fi network, a WI-MAX network, a cellular telephone network (such as, for example, a Global System for Mobile Communications (GSM) network, a 3G network, a 4G network, a 5G network, an LTE network, or other suitable wireless network or a combination of two or more of these. Computer system 600 may include any suitable communication interface 610 for any of these networks, where appropriate. Communication interface 610 may include one or more communication interfaces 610, where appropriate. Although this disclosure describes and illustrates a particular communication interface, this disclosure contemplates any suitable communication interface.

In particular embodiments, bus 612 includes hardware, software, or both coupling components of computer system 600 to each other. As an example and not by way of limitation, bus 612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 612 may include one or more buses 612, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A first device, comprising:
one or more processors; and
one or more computer-readable non-transitory storage media coupled to the one or more processors and comprising instructions that, when executed by the one or more processors, cause the first device to perform operations comprising:
scanning a code from a second device, wherein the code is generated by the second device in response to receiving a request to transfer account information from the second device to the first device;
determining information comprising a peer identifier and a first certificate hash using the code, wherein the first certificate hash is generated by the second device and the peer identifier is a verifiable link between a peer and its public cryptographic key;
initiating a connection with the second device using the peer identifier;
receiving a second certificate hash from the second device via the connection;
comparing the first certificate hash to the second certificate hash;
validating the second certificate hash using the first certificate hash;
establishing a session with the second device; and
transferring the account information to the second device via the session.

2. The first device of claim 1, wherein the code is a machine-readable image.

3. The first device of claim 1, wherein the connection is one of the following:
a Transport Layer Security (TLS) connection;
a Datagram Transport Layer Security (DTLS) connection; or
a Constrained Application Protocol (CoAP) connection.

4. The first device of claim 1, wherein the first certificate hash is generated by the second device by hashing a self-signed certificate.

5. The first device of claim 1, wherein:
an operating system of the first device is one of the following:
an iPhone Operating System (iOS); or
an Android OS; and
an operating system of the second device is one of the following:
an iOS; or
an Android OS.

6. The first device of claim 1, wherein:
the account information is associated with a mobile application installed on the first device; and
the account information comprises an identity of at least one third-party account.

7. The first device of claim 1, wherein the session is an encrypted, authenticated multi-party computation (MPC) session.

8. A method, comprising:
scanning, by a first device, a code from a second device, wherein the code is generated by the second device in response to receiving a request to transfer account information from the second device to the first device;
determining, by the first device, information comprising a peer identifier and a first certificate hash using the code, wherein the first certificate hash is generated by the second device and the peer identifier is a verifiable link between a peer and its public cryptographic key;
initiating, by the first device, a connection with the second device using the peer identifier;
receiving, by the first device, a second certificate hash from the second device via the connection;
comparing, by the first device, the first certificate hash to the second certificate hash;
validating, by the first device, the second certificate hash using the first certificate hash;
establishing, by the first device, a session with the second device; and
transferring, by the first device, the account information to the second device via the session.

9. The method of claim 8, wherein the code is a machine-readable image.

10. The method of claim 8, wherein the connection is one of the following:
a Transport Layer Security (TLS) connection;
a Datagram Transport Layer Security (DTLS) connection; or
a Constrained Application Protocol (CoAP) connection.

11. The method of claim 8, wherein the first certificate hash is generated by the second device by hashing a self-signed certificate.

12. The method of claim 8, wherein:
an operating system of the first device is one of the following:
an iPhone Operating System (iOS); or
an Android OS; and
an operating system of the second device is one of the following:
an iOS; or
an Android OS.

13. The method of claim 8, wherein:
the account information is associated with a mobile application installed on the first device; and
the account information comprises an identity of at least one third-party account.

14. The method of claim 8, wherein the session is an encrypted, authenticated multi-party computation (MPC) session.

15. One or more computer-readable non-transitory storage media embodying instructions that, when executed by a processor, cause the processor to perform operations comprising:
scanning, by a first device, a code from a second device, wherein the code is generated by the second device in response to receiving a request to transfer account information from the second device to the first device;
determining information comprising a peer identifier and a first certificate hash using the code, wherein the first certificate hash is generated by the second device and the peer identifier is a verifiable link between a peer and its public cryptographic key;

initiating a connection with the second device using the peer identifier;

receiving a second certificate hash from the second device via the connection;

determining that the first certificate hash matches the second certificate hash;

validating the second certificate hash using the first certificate hash;

establishing a session with the second device; and transferring the account information to the second device via the session.

16. The one or more computer-readable non-transitory storage media of claim 15, wherein the code is a machine-readable image.

17. The one or more computer-readable non-transitory storage media of claim 15, wherein the connection is one of the following:
   a Transport Layer Security (TLS) connection;
   a Datagram Transport Layer Security (DTLS) connection; or
   a Constrained Application Protocol (CoAP) connection.

18. The one or more computer-readable non-transitory storage media of claim 15, wherein the first certificate hash is generated by the second device by hashing a self-signed certificate.

19. The one or more computer-readable non-transitory storage media of claim 15, wherein:
   an operating system of the first device is one of the following:
      an iPhone Operating System (iOS); or
      an Android OS; and
   an operating system of the second device is one of the following:
      an iOS; or
      an Android OS.

20. The one or more computer-readable non-transitory storage media of claim 15, wherein:
   the account information is associated with a mobile application installed on the first device; and
   the account information comprises an identity of at least one third-party account.

* * * * *